Aug. 24, 1943.   L. L. ANTES   2,327,692
GRAVITY METER
Filed April 7, 1942
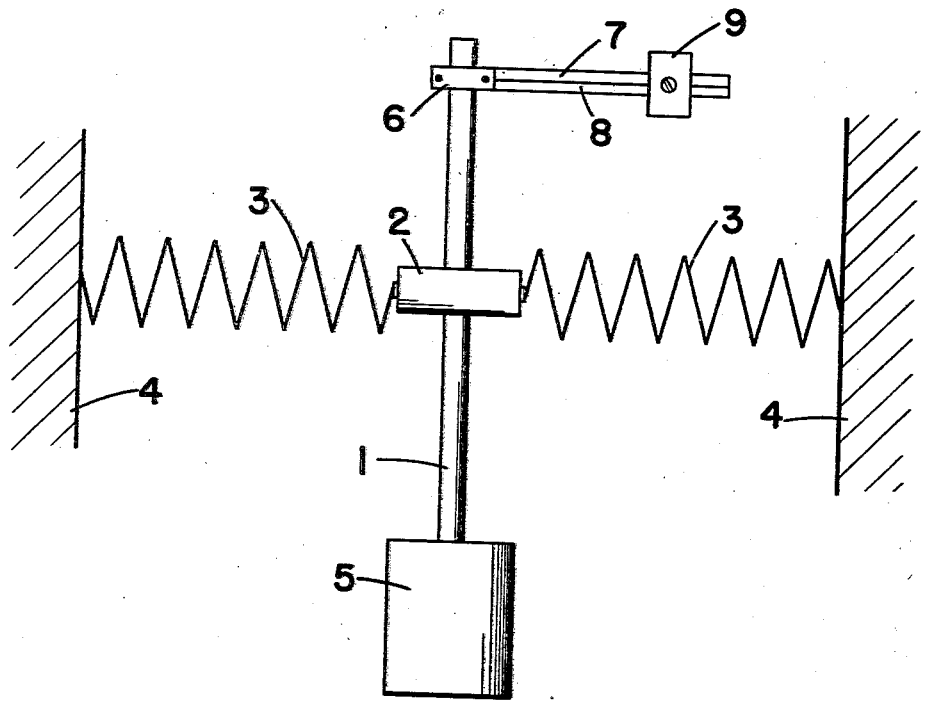
Leland L. Antes INVENTOR.
BY P. J. Whelan
ATTORNEY Patented Aug. 24, 1943

2,327,692

UNITED STATES PATENT OFFICE 2,327,692

GRAVITY METER

Leland L. Antes, Houston, Tex., assignor to Standard Oil Development Company, a corporation of Delaware Application April 7, 1942, Serial No. 437,953

2 Claims. (Cl. 265—1.4)

The present invention is directed to a gravity meter, or similar force measuring device.

The principal object of the present invention is the provision in a meter of the character referred to, in which a mass subject to the force to be measured is mounted for movement about a suspended fulcrum, of means for compensating for the effect of temperature on the suspension means.

More specifically, the principal object of the present invention is the provision in a gravity meter, of the type described in Patent #2,183,115, of means for compensating for the effect of temperature changes on the suspension springs.

The present invention may be more fully understood from the following detailed description of the accompanying drawing in which the single figure is a plan view of one embodiment of the present invention.

Referring to the drawing in detail, it may be observed at the outset that only the bare skeleton of the gravity meter is shown in order to simplify the disclosure of the present invention. For further details of the meter reference may be had to the above identified patent. Numeral 1 designates a lever arm carrying intermediate its ends a cross piece 2 to each end of which is connected one end of a torsion spring 3, the other end of which is connected to a wall 4. The lever carries a mass 5 which is the force responsive element, the movement of which in response to gravity is to be measured. It will be understood that the springs are normally so adjusted as to hold the lever arm horizontal or in null position.

At the other end of the lever arm is fixed, or slidably mounted if desired, a block 6 carrying a compound arm made of two dissimilar metals 7 and 8, which are welded together. Slidably mounted on this compound arm is a suitably chosen mass 9. The metals for the elements 7 and 8 are so chosen that the bi-metallic strip will bend in one direction or the other, depending upon the temperature. As the arms bend the moment arm of the mass 9, with respect to the fulcrum point of the lever 1, changes an amount depending on the reactivity of the bi-metallic strip to temperature changes. Thus, if the springs 3 tend to expand and exert less torque on the element 2 with an increase in temperature, the bi-metallic strip can be selected to increase the moment arm of the compensating mass 9, thus increasing the force in opposition to the mass 5. It will be understood that the bi-metallic strip may be any combination of metals, with different temperature coefficients, welded together. For example, the strip 7 might be Invar steel, and strip 8 a steel of distinctly different temperature coefficient.

The nature and objects of the present invention having been thus described and illustrated, what is claimed as new and useful and is desired to be secured by Letters Patent is:

1. A gravity meter comprising a lever suspended intermediate its ends by a pair of oppositely disposed, horizontally aligned torsion springs, a mass secured to one end of said lever arm, a laterally extending bi-metallic strip carried by the other end of said lever arm, and a compensating mass slidingly mounted on said bi-metallic strip.

2. An apparatus according to claim 1 in which said bi-metallic strip is slidingly mounted on said lever arm.

LELAND L. ANTES.